United States Patent [19]
Woodall, Jr. et al.

[11] Patent Number: 6,130,642
[45] Date of Patent: Oct. 10, 2000

[54] METHOD AND SYSTEM TO IMPROVE GPS NAVIGATION

[75] Inventors: Robert C. Woodall, Jr., Lynn Haven; Felipe A. Garcia, Panama City, both of Fla.

[73] Assignee: The United States of America as represented by the Secretary of the Navy, Washington, D.C.

[21] Appl. No.: 09/000,571

[22] Filed: Dec. 30, 1997

Related U.S. Application Data

[63] Continuation-in-part of application No. 08/821,964, Mar. 4, 1997, abandoned.

[51] Int. Cl.[7] ............................................. G01S 5/02
[52] U.S. Cl. .................................. 342/357.09; 342/464
[58] Field of Search .......................... 342/357.09, 386, 342/464; 367/4

[56] References Cited

U.S. PATENT DOCUMENTS

| | | | |
|---|---|---|---|
| 5,042,744 | 8/1991 | Travor et al. ........................... | 244/3.29 |
| 5,456,427 | 10/1995 | Greenhalgh ........................ | 244/138 R |
| 5,522,567 | 6/1996 | Kinstler ................................. | 244/3.15 |
| 5,554,994 | 9/1996 | Schneider ............................ | 342/357.06 |
| 5,646,630 | 7/1997 | Sheynblat et al. .................. | 342/357.14 |
| 5,686,924 | 11/1997 | Trimble et al. ..................... | 342/357.09 |
| 5,741,167 | 4/1998 | Hagerty ..................................... | 441/13 |
| 5,886,665 | 3/1999 | Dosh et al. ............................. | 701/213 |

FOREIGN PATENT DOCUMENTS

| | | | |
|---|---|---|---|
| 0357441 | 3/1990 | European Pat. Off. ......... | H01Q 1/04 |

*Primary Examiner*—Gregory C. Issing
*Attorney, Agent, or Firm*—Harvey A. Gilbert; Donald G. Peck

[57] ABSTRACT

A method and system are provided for improving the navigation accuracy of a vehicle guided by the global positioning system (GPS). The system can be permanent or can be delivered "on station" by delivery vehicles dropped from a host aircraft. If delivered, each delivery vehicle travels to a destination at the earth's surface on land or at sea. At each destination, an antenna and a GPS receiver use GPS signals and determine the position of the antenna. A transmitter coupled between the GPS receiver and the antenna transmits the determined position of the antenna over the air waves via the antenna. In this way, a plurality of earth-bound GPS positions can be used by a GPS-guided vehicle to improve its navigation accuracy thereby eliminating the atmospheric errors associated with satellite-transmitted signals.

14 Claims, 3 Drawing Sheets

METHOD AND SYSTEM TO IMPROVE GPS NAVIGATION

This is a continuation-in-part of application Ser. No. 08/821,964 filed Mar. 4, 1997 now abandoned.

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to global positioning system (GPS) navigation, and more particularly to a method and system that improves the navigation accuracy of a vehicle being guided by GPS.

BACKGROUND OF THE INVENTION

Use of the global positioning system (GPS) is growing rapidly in both the military and commercial sectors for a variety of applications such as guidance, navigation, search and recovery missions and surveying, just to name a few. It is also known that atmospheric and ionospheric influences of GPS signals (transmitted from the orbiting GPS satellites) cause approximately a 13 meter circular error probability (CEP) in position determining and navigation accuracy. This means that triangulation using GPS signals can generate position coordinates that are off by as much as 13 meters at any given time. However, this error is not acceptable in some applications. One such example is the clearing of littoral obstacles and mines at coastal regions via the use of GPS-guided weapons.

Amphibious assault through coastal regions defended by littoral obstacles and mines is a dangerous mission. The National Security Act of 1947 requires the United States Marine Corps to maintain the capability to effect a forcible entry onto a defended shore by means of amphibious assault. Towards this end, several means are being developed to effect such a forcible entry. One method makes use of precision GPS-guided munitions released from aircraft to strike anti-invasion mines and obstacles placed in shallow water and beach heads by an enemy. These precision, GPS-guided munitions are intended to strike specific lanes of entry and clear them by means of explosive detonation. However, as noted above, current GPS precision in these munitions is limited due to atmospheric and ionospheric influences. Thus, the munitions can only be targeted to an entire area. In general, this means that more munitions will be required than actually necessary thereby requiring more sorties than actually necessary. This increases the risk to military pilots and obviously adds to the cost of the mission.

One approach to dealing with the error introduced by atmospheric and ionospheric influences is disclosed by Schneider in U.S. Pat. No. 5,554,994. Briefly, Schneider discloses a self-surveying relative GPS weapons guidance system in which a ground sensor surveys a plurality of GPS satellites. The ground sensor calculates its location both immediately upon acquiring GPS signals and again after several hours have passed. The difference between the two calculated locations is a GPS error which is then transmitted from the ground sensor. Incoming guided weapons use GPS satellite signals and the ground sensor-transmitted error to navigate more precisely to their aim point.

There are several drawbacks to the system disclosed by Schneider. For example, the navigation processor onboard a guided weapon must first calculate its rough position using the GPS satellite signals and then incorporate the error computation from the ground-based sensor in order to determine its position more accurately. More importantly, the error calculated and transmitted by the ground-based sensor is not the actual error experienced by the guided weapon. This is because the error path from any given satellite to the moving weapon is different from the error experienced and calculated by the ground-based sensor. The most notable cause of this difference is the transmission path length difference. In other words, GPS signal distortion between the guided weapon and a satellite is different than that between the ground-based sensor and the same satellite. Thus, the error transmitted by the ground-based sensor is not the error (correction) needed by the guided weapon to achieve the best navigation accuracy.

SUMMARY OF THE INVENTION

Accordingly, it is an object of the present invention to provide a method and system for improving the navigation precision of a vehicle guided by GPS.

Another object of the present invention is to provide a method and system for improving the strike precision of GPS guided munitions in littoral obstacle and mine clearing missions.

Still another object of the present invention is to provide a clandestine method and system that improves the navigation accuracy of GPS-guided vehicles while remaining difficult to detect or undetectable by enemy surveillance.

Other objects and advantages of the present invention will become more obvious hereinafter in the specification and drawings.

In accordance with the present invention, a method and system are provided for improving the navigation accuracy of a vehicle guided by the global positioning system (GPS). For a seawater or ground-based system, a plurality of antennas are positioned at the earth's surface. A GPS receiver is coupled to the antenna to receive GPS signals from a plurality of GPS satellites. The GPS receiver determines the position of the antenna based on the GPS signals. A transmitter is coupled between the GPS receiver and the antenna for transmitting the position of the antenna over the air waves via the antenna. The positions transmitted from the earth's surface can be used by GPS guided vehicles for navigation.

DETAILED DESCRIPTION OF THE INVENTION

Figure 1:
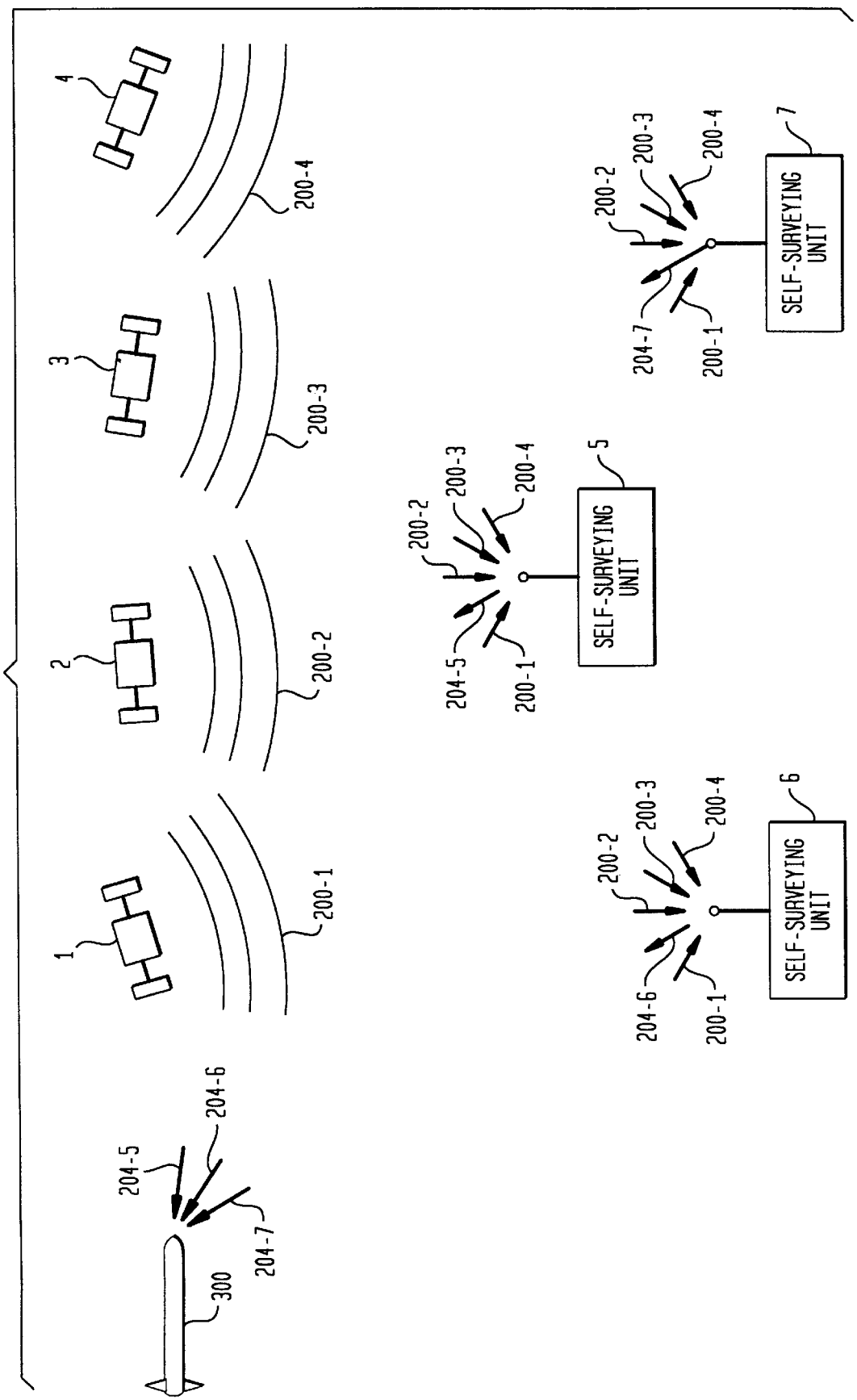
FIG. 1 depicts an operation scenario using the system of the present invention to improve navigation of GPS-guided vehicles.

Referring now to the drawings, and more particularly to FIG. 1, an operation scenario is depicted that uses the present invention to improve the navigation of a GPS-guided vehicle 300. A plurality of orbiting GPS satellites 1, 2, 3 and 4 transmit GPS signals 200-1, 200-2, 200-3 and 200-4, respectively, towards the earth. One or more (e.g., three are shown) earth-based self-surveying GPS units 5, 6 and 7 are shown in a spaced-apart configuration. While the use of only one of units 5, 6 and 7 is necessary to improve upon basic satellite GPS navigation precision, the more self-surveying units that are available, the more accurate the navigation will be. For in-flight vehicle guidance and navigation, it is preferable to use at least three earth-based self-surveying units spaced apart from one another in an operations area by distances of 0.5 to 25 nautical miles. Units 5, 6 and 7 can be on or near the earth's surface, i.e., on the ground or at sea. As will be explained further below, each of units 5, 6 and 7 is equipped to receive GPS signals 200-1, 200-2, 200-3 and 200-4, accurately determine their position using these GPS signals, and transmit their accurately determined position (automatically or on-demand) as true position signals 204-5, 204-6 and 204-7, respectively.

In operation, vehicle 300 navigates using the GPS signals from satellites 1, 2, 3 and 4 (or other GPS satellites that are in its field-of-view) until such time that vehicle in range to receive true position signals 204-5, 204-6 and 204-7. At that point, vehicle 300 ignores GPS signals 200-1, 200-2, 200-3 and 200-4 and begins to navigate using true position signals 204-5, 204-6 and 204-7. For example, vehicle 300 could be guided by the satellites to a preprogrammed distance (e.g., 50 to 100 NM) from a target destination at which point logic onboard vehicle 300 would begin to ignore GPS signals 200-1, 200-2, 200-3 and 200-4 originating from the satellites. At the same time, navigation of vehicle 300 would begin to use true position signals 204-5, 204-6 and 204-7. True position signals 204-5, 204-6 and 204-7 could by transmitted, for example, at a slightly different frequency or modulation rate in order to be easily distinguished from GPS signals 200-1, 200-2, 200-3 and 200-4.

The present invention can use a differential time-lapsed GPS signal comparison technique (or DGPS as it is known) to determine the position of each unit 5, 6 and 7 more accurately than an "instantaneous position" that can be determined by a GPS receiver at any given moment using satellite GPS signals. One such DGPS technique is disclosed by Malys et al. in Geophysical Research Letters, Vol. 17, No. 5, pp. 651–654, April 1990.

True position signals 204-5, 204-6 and 204-7 are more accurate representations of position than an "instantaneous position" because atmospheric distortion inherent to the satellite signals is eliminated by the present invention. Additionally, since the earth-based transmissions do not have to pass through the ionosphere to vehicle 300, the earth-based transmissions are less distorted when they arrive at vehicle 300. Further, because the earth-based transmissions are closer to vehicle 300 than the satellites, true position signals from units 5, 6 and 7 are less distorted due to other atmospheric influences.

Since the positions of units 5, 6 and 7 are accurately known, triangulation error at vehicle 300 is greatly reduced. Further, since the present invention does not broadcast an error correction signal, the processing onboard vehicle 300 is inherently more simple and accurate. Simpler processing means that vehicle 300 can update its position and make course adjustments more frequently thereby reducing navigation error. Still further, the present invention is inherently more accurate than an error-based system because it is unaffected by the differences between the transmission path length between an on-station self-surveying unit and a satellite and the transmission path length between vehicle 300 and the same satellite.

Figure 2:
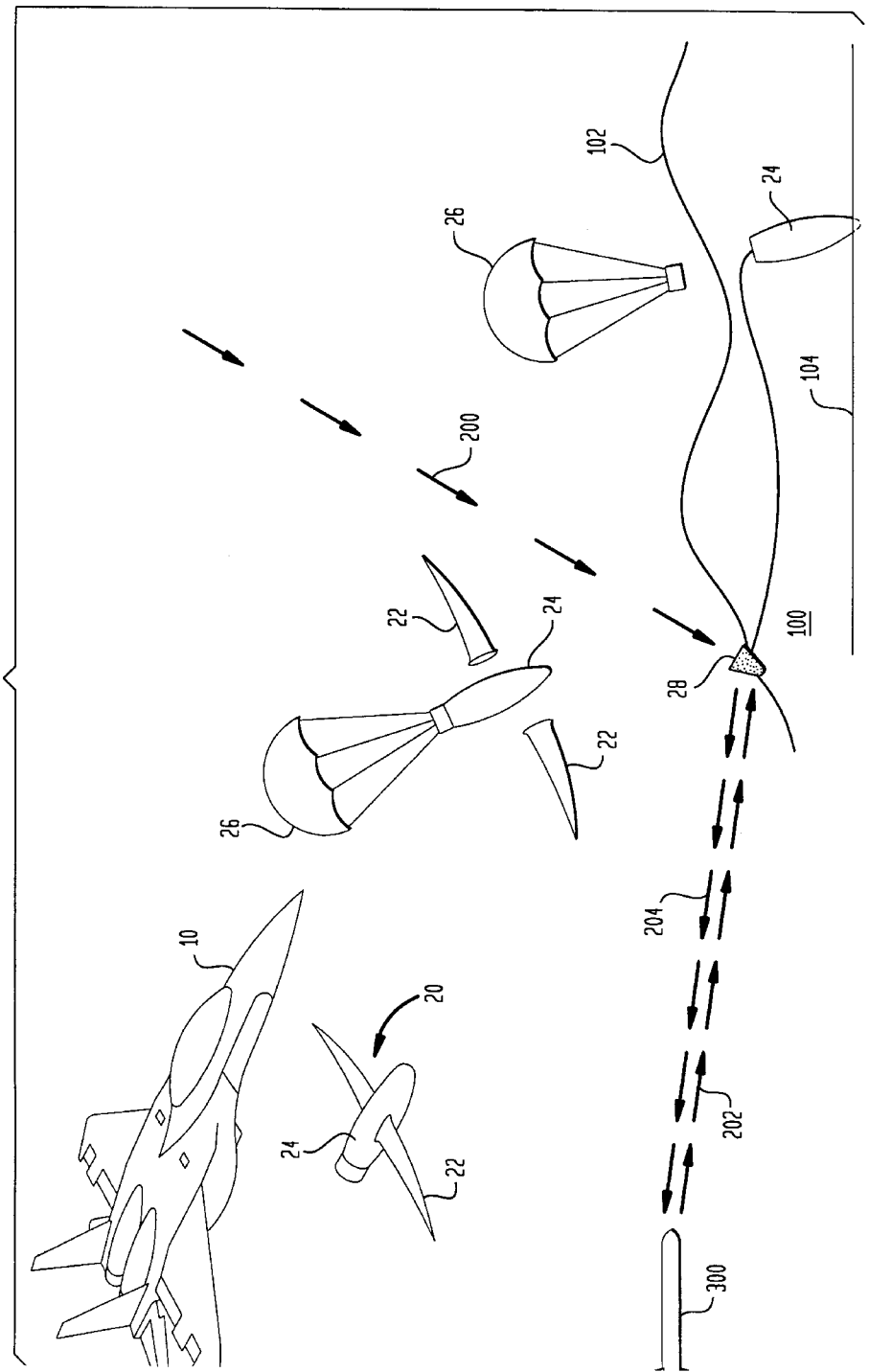
FIG. 2 depicts a deployment sequence and operation scenario of one delivery vehicle used by the present invention.

Referring now to FIG. 2, a deployment sequence and operation scenario for one on-station self-surveying unit of the present invention is shown for use in littoral obstacle and mine clearing missions. Thus, in the illustrated example, the on-station self-surveying units are at the water's surface so that GPS-guided munitions can be guided with greater precision to a destination near the coast with minimal risk of enemy detection or tampering. However, it is to be understood that the method and system of the present invention can also be ground-based and used to improve the navigation of any vehicle guided by GPS.

A host vehicle 10 travels to the vicinity (e.g., a typical standoff range of 50–75 NM) of a deployment destination at which point a plurality of delivery vehicles 20 are released therefrom. For clarity of illustration, deployment and operation of only one delivery vehicle 20 will be shown and described. In general, host vehicle 10 is an aircraft (e.g., plane, helicopter, etc.) that can travel quickly to and from the vicinity of deployment without being easily detected by enemy surveillance. Once within the desired vicinity at a desired altitude and air speed, host vehicle 10 releases delivery vehicles 20 which is capable of flying via GPS (or an onboard inertial navigation system) to a ballistic drop zone approximately above the deployment destination. For example, each delivery vehicle 20 could be a glide vehicle equipped with wings 22 that are separated from a housing body 24 at a desired altitude and range from the deployment destination as will be explained further below.

Once wings 22 are jettisoned, a drag device such as a parachute 26 slows the ballistic descent of housing body 24. Upon impact with the surface 102 of a body of water 100, parachute 26 is caused to separate from housing body 24. At this point, housing body 24 sinks to the bottom 104 while a floating or buoyant antenna 28 is deployed therefrom. Operationally, antenna 28 begins to receive GPS signals (represented by arrows 200) from a plurality of GPS satellites (not shown) orbiting the earth. As will be explained in greater detail below, systems maintained in housing body 24 use GPS signals 200 to establish the position of antenna 28. The accuracy of the position of antenna 28 improves the longer antenna 28 is "on station". In general, antenna 28 will determine its position using DGPS to within a few centimeters after being on station for approximately one hour. Thus, it is preferred that this time period lapse prior to the next phase of the present invention's operation.

Once the position of antenna 28 is established as just described, an activation signal (represented by arrows 202) is transmitted from a remote location and is received by antenna 28. Activation signal 202 can, for example, originate from an incoming GPS-guided vehicle 300, e.g., self-guided munitions, flying to its target area such as a host munitions release platform, submarine or surface combatant. For purpose of the present invention, it is assumed that munitions 300 includes on-board systems (not shown) utilizing GPS signals for the navigation or guidance thereof. Activation signal 202 is received by antenna 28 and relayed to systems maintained in housing body 24 to initiate transmission (via antenna 28) of the position of antenna 28 that was determined using GPS signals 200. Transmission of the position of antenna 28 is represented by arrows 204. In this way, munitions 300 essentially has an extremely accurate position with which it can use in its navigation calculation. Since the GPS position of antenna 28 is absolutely or reasonably stationary and closer to munitions 300 than the continuously moving (i.e., orbiting) satellites, the error associated with the GPS position of antenna 28 is far less than the error associated with the moving satellites. After a sufficient time has passed for completion of the mission, housing body 24 and its systems can be destroyed via an on-board self-destruct mechanism as will be explained further below.

Figure 3:
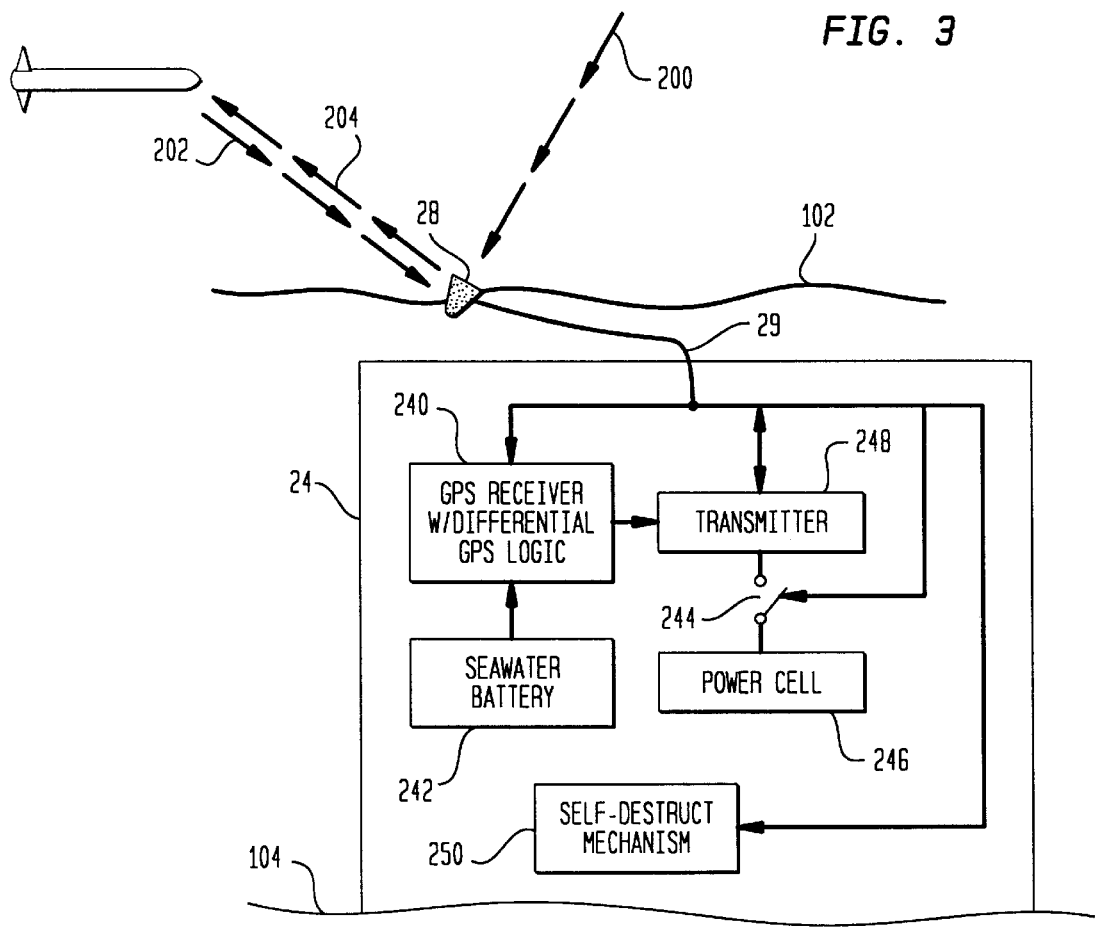
FIG. 3 is a schematic block diagram of one delivery vehicle used by the system of the present invention after it has been deployed underwater.

In FIG. 3, a schematic block diagram is depicted showing the systems maintained in housing body 24 for clandestinely operating the present invention. Antenna 28 relays GPS signals 200 over cable 29 to a GPS receiver 240. Power for GPS receiver 240 can be supplied by a seawater battery 242 (or other power cell) that can be actuated when housing body 24 takes on water as it sinks. One way of facilitating flooding of housing body 24 will be explained in detail below.

As mentioned above, GPS receiver 240 can include logic (i.e., circuitry and programming) to apply DGPS to determine the atmospheric induced errors in GPS signals 200. Briefly, application of the DGPS technique involves a GPS signal receiver (i.e., antenna 28) maintained at a position which is determined through time lapsed coordination of GPS signals 200. The differences between the various satellite coordinates determined by GPS receiver 240 and that of the known instantaneous satellite position coordinates relative to one another are compared. These comparisons are mathematically manipulated in accordance with known relationships to generate corrections to the atmospheric induced errors inherent in GPS signals 200. The atmospheric induced error corrections can be applied to determine the true position of antenna 28. That is, once the atmospheric induced error corrections are applied to the position based on GPS signals 200, a true position of antenna 28 can be accurately determined to 0.5 m CEP or less.

The accuracy of the position calculated for each of units 5, 6 and 7 can be further improved as follows. Each of units 5, 6 and 7 can use true position signals originating from the other earth-based units once they establish their position using the satellite-based GPS signals. That is, after a period of time (e.g., one hour) that a unit has been on-station, each unit's GPS receiver 240 could execute programming to ignore GPS signals 200-1, 200-2, 200-3 and 200-4 and, instead, use the true position signals from the other earth-based units. Applying the DGPS technique to the earth-based true position signals will allow each unit to further reduce its CEP.

The true position of antenna 28 can be broadcast continuously or when activation signal 202 is received. Activation signal 202 can originate from a variety of sources such as munitions 300, a ship's radar sweep, etc. Regardless of how received, activation signal 202 can be used to close a switch 244 that couples a power cell 246 (e.g., a chemical power cell such as a lithium thermal battery) to transmitter 248. Once powered, transmitter 248 begins to transmit (via antenna 28) the true position signals 204 via antenna 28.

If it is necessary to prevent housing body 24 and its contents from being recovered by unfriendly forces, a self-destruct mechanism 250 can be provided within housing body 24. Activation of self-destruct mechanism 250 can occur in a variety of ways. For example, self-destruct mechanism 250 may include a timer (not shown) that is activated by activation signals 202. In this way, after sufficient time has lapsed to allow for completion of the mission, self-destruct mechanism 250 would be initiated without further intervention. Another possible method of initiation could utilize a separate initiation signal originating from a remote location any time after deployment. Mechanism 250 can also contain anti-tampering trembler switches (not shown) to initiate the self-destruction upon excessive movement of the unit after deployment.

Figure 4:
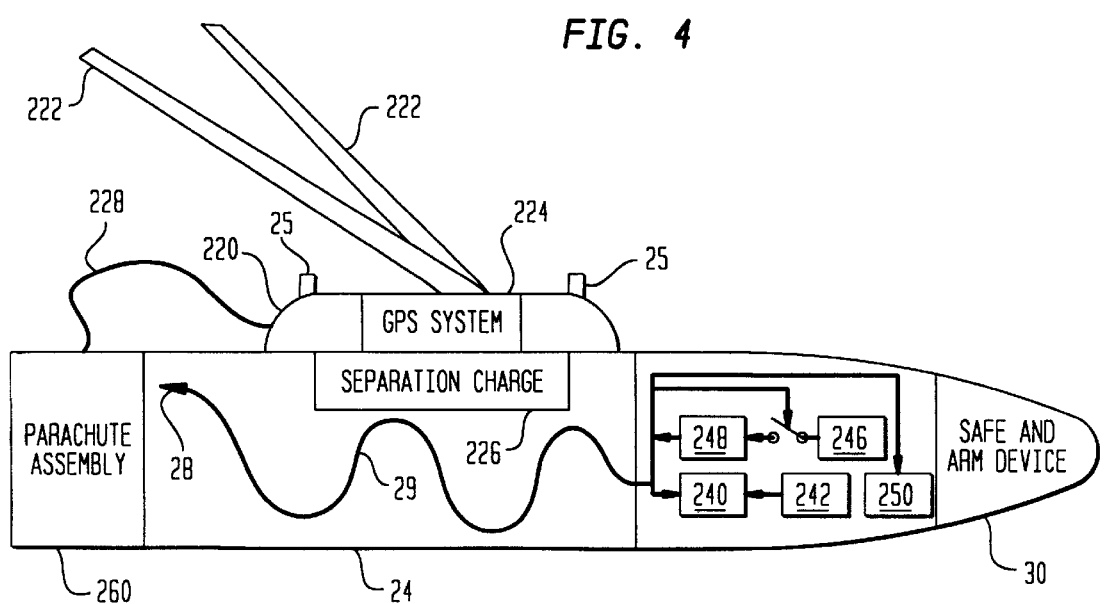
FIG. 4 is a schematic view of a munitions case or housing adapted as a delivery vehicle according to the present invention.

One embodiment of delivery vehicle 20 (FIG. 2) is shown schematically in FIG. 4 where housing body 24 is a hollowed-out munitions housing or case. Munitions housings are generally a good off-the-shelf choice for clandestine operations of the present invention owing to their small radar cross-section and aerodynamic profile which allows for the remote deployment thereof. Of course, other specially designed delivery vehicles can be used (e.g., airborne or waterborne vehicles), any of which can utilize radar absorbing coatings and stealth technology.

When using a munitions housing for housing body 24, a wing "kit" is attached to body 24. The wing "kit" can deploy wings to allow body 24 to glide and steer as a winged aircraft and then jettison the wings at a given time or location to allow body 24 to fall ballistically. A variety of such wing "kits" are known in the art and are available commercially. One such commercially available system is the Longshot™ GPS Guided Wing Kit manufactured by Leigh Aero Systems, Carlsbad, Calif. Briefly, this wing kit includes a base 220 mounted to housing body 24 using, for example, aircraft lug mounts 25 provided on housing body 24. Wings 222 extend from housing body 24 once it is free from the host aircraft. The wing kit has its own GPS system 224 for determining range and altitude. At a given range to a target location and/or altitude, a separation charge 226 is initiated to cause the combination of base 220 and wings 222 to be jettisoned from housing body 24.

Base 220 is coupled mechanically or electromechanically to parachute assembly 260 at the aft end of housing body 24. Stored within parachute assembly 260 is a parachute (not shown in FIG. 4) that deploys (see parachute 26 in FIG. 2) as base 220 separates from housing body 24. For example, a lanyard 228 can be coupled to base 220 and parachute assembly 260 so that as base 220 and wings 222 are jettisoned, lanyard 228 pulls the parachute from parachute assembly 260. Lanyard 228 would then release due to the aerodynamic and tensile forces acting on the jettisoned base 220 and wings 222.

As shown in FIG. 2, housing body 24 then begins to descend ballistically towards its water destination. A safe-and-arm device 30 is provided in the nose of housing body 24. Safe-and-arm device 30 is coupled to a separation charge 32 at the aft end of housing body 24. Upon water impact, safe-and-arm device 30 initiates separation charge 32 to separate parachute assembly 260 from housing body 24. this opens the aft end of housing body 24 so that buoyant antenna 28 can deploy therefrom and so that water can enter housing body 24 to sink same and activate seawater battery 242 (FIG. 3)

The advantages of the present invention are numerous. The precision placement of GPS-guided munitions is greatly improved owing to the establishment of a plurality of reasonably stationary, accurate position signals originating on the ground or at sea. GPS guided vehicles will be able to more accurately navigate using the precise position coordinates broadcast from the on-station self-surveying units. In terms of weapon guidance, the present invention provides a substantial improvement in delivery precision that will result in the use of fewer munitions for a given mission. Operational results will be achieved with fewer sorties and munitions thereby reducing the risk to pilots while also reducing logistics and reducing the overall expense of operations. The clandestine nature of the present invention, both in terms of deployment and operation, reduces the risk of enemy interception, exploitation and/or neutralization. The method and system of the present invention can be used to more precisely target specific targets of interest both at the shore and further inland since the present invention need not be stationed at a target. Thus, the present invention is not limited to amphibious assault objectives and could be used to aid in ship-to-shore navigation, cleared assault lane marking and possible offensive missions further inland.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for transmitting position signals from a plurality of earth-based positions using the global positioning system (GPS), comprising:

a plurality of delivery vehicles equipped to travel in air to a corresponding plurality of destinations at the surface of a body of water and equipped to sink to the bottom of the body of water;

an antenna mounted in each of said plurality of delivery vehicles and deployable therefrom to float at the surface as said delivery vehicle sinks to the bottom of the body of water;

a GPS receiver mounted in each of said plurality of delivery vehicles and coupled to said antenna for receiving GPS signals via said antenna from a plurality of GPS satellites and for, during an initial period of operation, determining an earth-based position of said antenna based on said GPS signals;

a transmitter mounted in each of said plurality of delivery vehicles and coupled between said GPS receiver and said antenna for transmitting a signal indicative of said earth-based position over the air waves via said antenna; and said GPS receiver, after expiration of said initial period of operation, determining said earth-based position of said antenna using said signal transmitted from antennas associated with others of said plurality of delivery vehicles.

2. A system as in claim 1 further comprising an activation unit mounted in each of said plurality of delivery vehicles and coupled to said transmitter, said activation unit receiving a remotely-generated activation signal and causing said transmitter to begin transmitting said signal when said activation signal is received.

3. A system as in claim 1 further comprising a self-destruct mechanism mounted in each of said plurality of delivery vehicles.

4. A system as in claim 1 wherein each of said plurality of delivery vehicles comprises:

a housing;

glide wings attached to said housing for allowing said housing to glide through the air after said housing is deployed in air from an aircraft;

a release mechanism for coupling said glide wings to said housing and for causing said glide wings to separate from said housing approximately above one of said corresponding plurality of destinations;

a drag device for reducing the speed of said housing descending ballistically under the force of gravity towards said one of said corresponding plurality of destinations when said glide wings are separated from said housing; and a decoupler mechanism coupling said drag device to said housing for separating said drag device from said housing when said housing strikes the surface of the water, wherein said antenna is deployed from said one end and sinking of said housing is facilitated.

5. A system as in claim 1 wherein said GPS receiver includes differential GPS logic.

6. A system for transmitting position signals from a plurality of earth-based positions using the global positioning system (GPS), comprising:

a plurality of delivery vehicles equipped to travel in air to a plurality of spaced-apart destinations at the surface of a body of water and equipped to sink to the bottom of the body of water;

an antenna mounted in each of said plurality of delivery vehicles and deployable therefrom to float at the surface as each of said plurality of delivery vehicles sinks to the bottom of the body of water;

a GPS receiver mounted in each of said plurality of delivery vehicles and coupled to said antenna for receiving GPS signals via said antenna from a plurality of GPS satellites and for, during an initial period of operation, determining an earth-based position of said antenna based on said GPS signals;

a first power source coupled to said GPS receiver for supplying power thereto;

a transmitter mounted in each of said plurality of delivery vehicles and coupled between said GPS receiver and said antenna for transmitting a signal indicative of said earth-based position over the air waves via said antenna;

a second power source coupled to said transmitter for supplying power thereto;

an activation unit mounted in each of said plurality of delivery vehicles and coupled between said antenna and said second power source, said activation unit receiving a remotely-generated activation signal via said antenna and initiating said second power source to begin supplying power to said transmitter wherein said transmitter begins transmitting said signal;

said GPS receiver, after expiration of said initial period of operation, determining said earth-based position of said antenna using said signal transmitted from antennas associated with others of said plurality of delivery vehicles; and a self-destruct mechanism mounted in each of said plurality of delivery vehicles.

7. A system as in claim 6 wherein each of said plurality of delivery vehicles comprises:

a munitions housing;

glide wings attached to said munitions housing for allowing said munitions housing to glide through the air after said munitions housing is deployed in air from an aircraft;

a release mechanism for coupling said glide wings to said munitions housing and for causing said glide wings to separate from said munitions housing approximately above one destination from said plurality of spaced-apart destinations;

a drag device for reducing the speed of said munitions housing descending ballistically under the force of gravity towards said one destination when said glide wings are separated from said munitions housing; and a decoupler mechanism coupling said drag device to said munitions housing for separating said drag device from said munitions housing when said munitions housing strikes the surface of the water, wherein said antenna is deployed from said one end and sinking of said munitions housing is facilitated.

8. A system as in claim 7 wherein said first power source is a seawater battery for supplying power to said GPS receiver when the seawater enters said munitions housing.

9. A system as in claim 7 wherein said drag device is a parachute.

10. A system as in claim 6 wherein said GPS receiver includes differential GPS logic.

11. A method for transmitting position signals from a plurality of earth-based positions using the global positioning system (GPS), comprising the steps of:

deploying a plurality of antennas in proximity to the earth's surface;

providing, for each antenna from said plurality of antennas, a GPS receiver coupled to said each antenna and a transmitter coupled to said GPS receiver and said each antenna;

operating each said GPS receiver to receive GPS signals via said each antenna from a plurality of GPS satellites for a period of time sufficient for a position of said each antenna to be established based on said GPS signals, wherein said step of operating said GPS receiver includes the step of applying, during said period of time, differential GPS processing to said GPS signals to determine corrections to atmospheric induced errors associated with said GPS signals;

activating said transmitter from a remote location after said period of time wherein said position of said each antenna is transmitted over the air waves via said each antenna in a manner distinguishable from said GPS signals;

operating, after the expiration of said period of time, each said GPS receiver to receive said position transmitted over the air waves from antennas associated with others of said plurality of antennas; and applying, after the expiration of said period of time, differential GPS processing to said position transmitted over the air waves from antennas associated with others of said plurality of antennas.

12. A method according to claim 11 wherein said period of time is at least approximately 1 hour.

13. A method according to claim 11 further comprising the step of deactivating said transmitter after a second period of time has elapsed.

14. A method according to claim 13 wherein said step of deactivating comprises the steps of:

providing a self-destruct mechanism in proximity of said GPS receiver and said transmitter; and activating said self-destruct mechanism at the completion of said second period of time wherein said GPS receiver and said transmitter are rendered inoperable.

* * * * *